United States Patent [19]
Kikuchi

[11] 3,925,878
[45] Dec. 16, 1975

[54] GRINDING MACHINE WITH AN AUTOMATIC EXCHANGE DEVICE FOR GRINDING WHEELS

[75] Inventor: Makoto Kikuchi, Kariya, Japan

[73] Assignee: Toyoda-Koki Kabushiki-Kaisha, Kariya, Japan

[22] Filed: May 17, 1974

[21] Appl. No.: 470,936

[30] Foreign Application Priority Data
May 17, 1973  Japan.................................. 48-54935
May 17, 1973  Japan.................................. 48-54937

[52] U.S. Cl................ 29/568; 51/5 R; 51/116 MH; 51/262 R
[51] Int. Cl.²......................................... B23Q 3/157
[58] Field of Search............ 51/5 R, 165.87, 166 R, 51/166 TS, 166 FB, 166 MH, 168, 169, 262 R; 29/568

[56] References Cited
UNITED STATES PATENTS

| | | | |
|---|---|---|---|
| 2,695,482 | 11/1954 | Polster | 51/262 R |
| 2,707,855 | 5/1955 | Miller | 51/166 T |
| 2,804,727 | 9/1957 | Schmidt | 51/166 R |
| 3,526,033 | 9/1970 | Saunders | 29/568 |
| 3,627,490 | 12/1971 | Asano | 51/165.87 |
| 3,789,472 | 2/1974 | Pegard | 29/568 |

Primary Examiner—Donald G. Kelly
Attorney, Agent, or Firm—Oblon, Fisher, Spivak, McClelland & Maier

[57] ABSTRACT

A grinding machine includes a wheel head, a wheel spindle rotatably mounted upon the wheel head, a storage device for removably storing a plurality of grinding wheels, and an exchange device for transferring the grinding wheels between the storage device and the wheel head and for securing the wheels upon the wheel spindle. The storage device may store the wheels in a horizontal array and is provided with a plurality of stub shafts for respectively supporting the wheels in a manner similar to the mounting of the same upon the wheel spindle. The exchange device includes a transfer device for gripping and transferring the wheels and a drive device for rotating a threaded member provided upon the grinding wheel sleeves so as to firmly attach the wheel sleeves and wheels to the wheel spindle through means of a connection between the threaded member and a threaded socket within the wheel spindle. The drive device is provided with a first drive actuator for driving the threaded member by means of a first force, and a second drive actuator for applying a second force to the threaded member at the same time the first force is being exerted upon the threaded member whereby the same is easily loosened and threadedly retracted from the wheel spindle.

12 Claims, 11 Drawing Figures

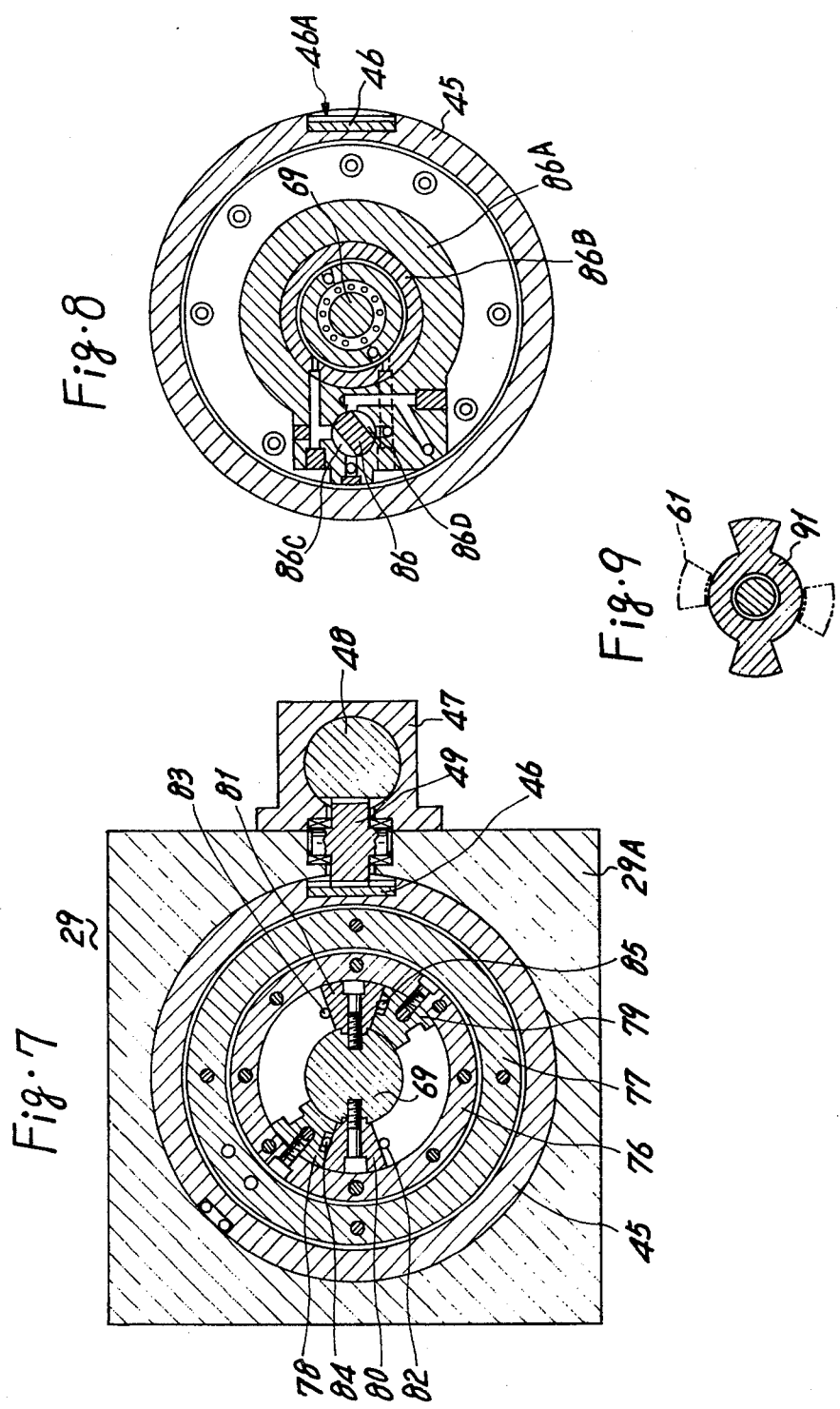

GRINDING MACHINE WITH AN AUTOMATIC EXCHANGE DEVICE FOR GRINDING WHEELS

BACKGROUND OF THE INVENTION

1. Field of the Invention

The present invention relates generally to a machine tool having an exchange device for a disk-like rotary tool, such as for example, a grinding wheel, and more particularly to an improved grinding machine which may selectively mount various kinds of grinding wheels upon the wheel spindle thereof by adopting an automatic exchange device whereby a grinding wheel presently disposed upon the wheel spindle may be exchanged with another grinding wheel when the present grinding wheel has been worn or when the contour or material of the workpiece to be machined necessitates such an exchange of tools.

2. Description of the Prior Art

As concerns grinding machines, it is generally necessary to exchange a previously used grinding wheel with another grinding wheel when the former has become worn to a minimum tolerable size, or in the instance that the grinding machine is required to machine a workpiece which differs in contour or material from the workpiece being ground by means of the previously used grinding wheel. Such an exchange operation is usually manually performed by an operator and is therefore quite difficult and laborious. The problems are especially acute in the instance of the so-called angular slide type cylindrical grinding machine in which the wheel spindle is disposed obliquely, at a predetermined angle, with respect to the axis of the work-supports, and despite the fact that the grinding wheel may be light, the above defects are regarded as significant problems due to the fact that there are many devices, such as for example, the tail stock and auxiliary devices thereof, which interfere with the axial removal of the grinding wheel from the wheel spindle of the wheel head.

In order to allegedly solve the aforenoted defects, there has recently been developed technology which has been disclosed within U.S. Pat. No. 3,627,490, issued to H. Asano, however many problems remain to be solved with respect to the storage device employed for the grinding wheels, the arrangement between the grinding machine and the storage device, and the exchange device especially the nut-loosening mechanism thereof. More particularly, although the storage device may simply store a plurality of grinding wheels, consideration has not been included in order to deal with the storage of the grinding wheels without causing damage to the same, and/or to facilitate the quick and easy removal of a particular one of the wheels from the plurality of wheels being stored. In addition, with respect to the arrangement between the machine and the storage device, the latter is disposed at a substantial distance from the former, and consequently, a substantial amount of time required for the performance of the exchange operation.

Still further, as the grinding wheel is transferred from the storage device to the exchange device through means of rolling the same without sufficient support by other transfer means, the grinding wheel not only suffers damage along the cutting edge thereof but in addition, the joint between the wheel and the exchange device is also not correctly effected. Continuing still further, the nut loosening mechanism may not serve to easily to loosen the nut by which the grinding wheel has been fixed upon the wheel spindle due to the fact that the hammering force thereof may not be effectively exerted upon the nut.

SUMMARY OF THE INVENTION

Accordingly, it is an object of the present invention to provide a new and improved grinding machine having an improved storage device within which a plurality of grinding wheels may be stored and from which the same may be quickly removed in such a manner as not to suffer any damage along the cutting edges thereof.

Another object of the present invention is to provide a new and improved grinding machine within which a storage device is provided which includes a plurality of vertically extending stub shafts which are adapted to support grinding wheels thereon within a horizontal plane, the wheels being secured upon the shafts in a manner similar to that for securing the wheels upon the wheel spindle and without the necessity of employing additional securing means.

Still another object of the present invention is to provide a new and improved grinding machine within which an exchange device is capable of moving between the storage device and the wheel spindle for directly storing and removing the grinding wheels upon and from the storage device, and the wheel spindle, in order to reduce the exhange time and to avoid disorientation and improper connections of the grinding wheels upon the storage device and spindle.

Yet another object of the present invention is to provide a new and improved grinding machine within which an exchange device grips a wheel sleeve and grinding wheel stored within a storage device within a horizontal plane and is then pivoted about a horizontal axis through a predetermined angle so as to thereafter secure the wheel sleeve and wheel to a wheel spindle.

Yet still another object of the present invention is to provide a new and improved grinding machine within which a storage device is arranged alongside the machine base and within which an exchange device is pivoted through a path, with respect to a wheel spindle which is supported upon a wheel head mounted upon the machine base, so as to avoid any interference between the grinding wheel and the machine base during the exchange operation.

A further object of the present invention is to provide a new and improved grinding machine within which an exchange device is utilized for securely transferring a grinding wheel within a vertical plane to a storage device for storage thereon.

A still further object of the present invention is to provide a new and improved grinding machine within which a drive device for driving a threaded member which is provided to secure a grinding wheel to a wheel spindle is capable of applying a second force to the threaded member when a first force is being exerted upon the same whereby the threaded member may be easily and quickly loosened from the wheel spindle by means of the drive device so as to detach the grinding wheel from the wheel spindle.

The foregoing objects are achieved according to the present invention through the provision of a grinding machine having an automatic exchange device which comprises a storage device for storing a plurality of grinding wheels and an exchange device for transferring and exchanging the grinding wheels between the storage device and the grinding wheel spindle of a wheel head. The storage device is arranged alongside the machine base upon which the wheel head is mounted, and is provided with a plurality of vertically extending stub shafts, each of the wheel sleeves of the grinding wheels being formed with a bore which is adapted to be engaged with the wheel spindle and which may also be seated upon the stub shaft of the storage device. In this manner, the grinding wheels, each of which has been secured with respect to the wheel sleeves in concentric relationship therewith, are positively supported upon the stub shafts without the requirement of using additional securing means, and wherein further, the removal of the grinding wheels from the storage device may be carried out in a simple and quick operation.

In operation, the exchange device is moved within the vicinity of the storage device and directly grips one of the wheel sleeves and wheels so as to thereafter directly transfer such to the wheel spindle whereby disorientation and misconnection with the same may be avoided and the exchange time therefor be substantially reduced. In addition, after gripping the wheel, the exchange device is pivoted through such a path about a horizontal axis for transferring the same to the wheel spindle whereby any interference between the grinding wheel upon the device and the machine base is avoided notwithstanding the fact that the storage device is arranged alongside the machine base.

The exchange device is further provided with a driving device which may rotate a threaded member associated with each wheel sleeve for engaging a mating threaded member of the wheel spindle in order to firmly attach the wheel sleeve to the wheel spindle. In order to readily detach the wheel sleeve from the wheel spindle, the threaded member is also actuated by means of a second force in conjunction with a first force exerted thereon whereby the threaded member may be easily and quickly loosened.

According to another aspect of the present invention, there is also provided a storage device within which there is provided a wheel carrier having a plurality of horizontal, radially projecting stub shafts, the wheel carrier being rotated about a vertical axis so as to selectively index the stub shafts for the exchange operation. In conjunction with such, the exchange device serves to engage the wheel sleeves and wheels upon the stub shafts, through means of threaded members in a manner similar to that of connecting the same with the wheel spindle whereby the wheel sleeves may not be disengaged from the stub shafts even when the wheel carrier is rotated.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views and wherein:

FIG. 7 is a cross-sectional view of a rotary actuator taken along the line VII—VII of FIG. 4;

FIG. 8 is a cross-sectional view of a rotary valve taken along the line VIII—VIII of FIG. 4;

FIG. 9 is a cross-sectional view of the wheel sleeve drive device taken along the line IX—IX of FIG. 5;

DETAILED DESCRIPTION OF THE PREFERRED EMBODIMENTS

Figure 1:
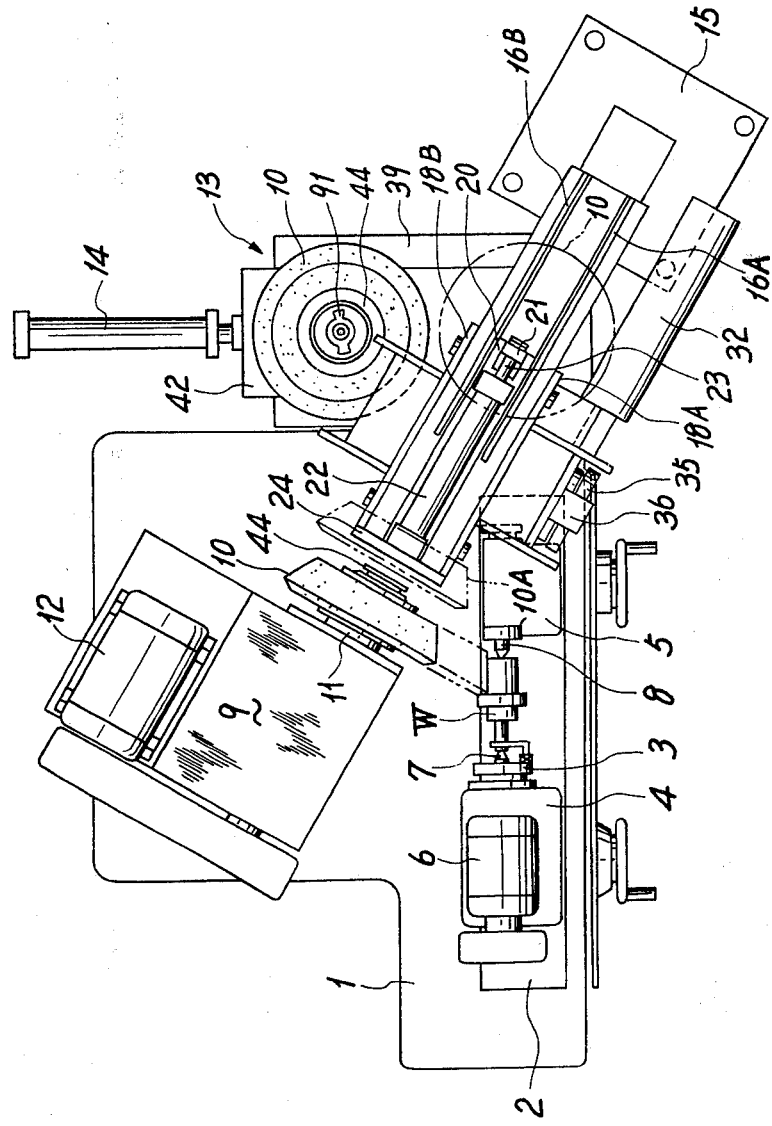
FIG. 1 is a plan view of one embodiment of a grinding machine constructed according to the present invention and showing its cooperative parts.

Referring now to the drawings, and more particularly to FIG. 1 thereof, the reference numeral 1 designates a bed of a grinding machine upon which a table 2 is slidable in a longitudinal direction. A head stock 4 and a tail stock 5 are disposed opposite each other and are adjustably fixed upon table 2 at respective predetermined positions therealong, a main spindle 3 being rotatably supported within head stock 4 so as to be rotated by means of a drive motor 6 which is fixedly mounted upon head stock 4. A cylindrical workpiece W is positively retained between center members 7 and 8, the former of which is firmly received within head stock 4 while the latter of which is slidably disposed within tail stock 5.

A wheel head 9 is movably mounted upon bed 1 in a direction oblique with respect to the axis of the workpiece W and within wheel head 9 there is rotatably mounted a wheel spindle 11, one end of which is connected to a motor 12 which is mounted in a laterally displaced position upon wheel head 9 while a grinding wheel 10 is fixedly secured to the other end of wheel spindle 11 so as to be rotatably driven by motor 12. Along the right side of bed 1, there is disposed a wheel storage magazine, generally indicated by the reference character 13, which houses a plurality, such as for example two, of grinding wheels 10 which are disposed within a horizontal plane, and which is arranged in such a manner as to be moved by means of a positioning cylinder 14 in a direction which extends perpendicular to the axis of the workpiece W, as described more particularly in detail hereinafter, a wheel exchange device being interposed between the wheel storage magazine 13 and the wheel head 9 in order to effect the pivotal and axial motion of the grinding wheels 10.

Figure 2:
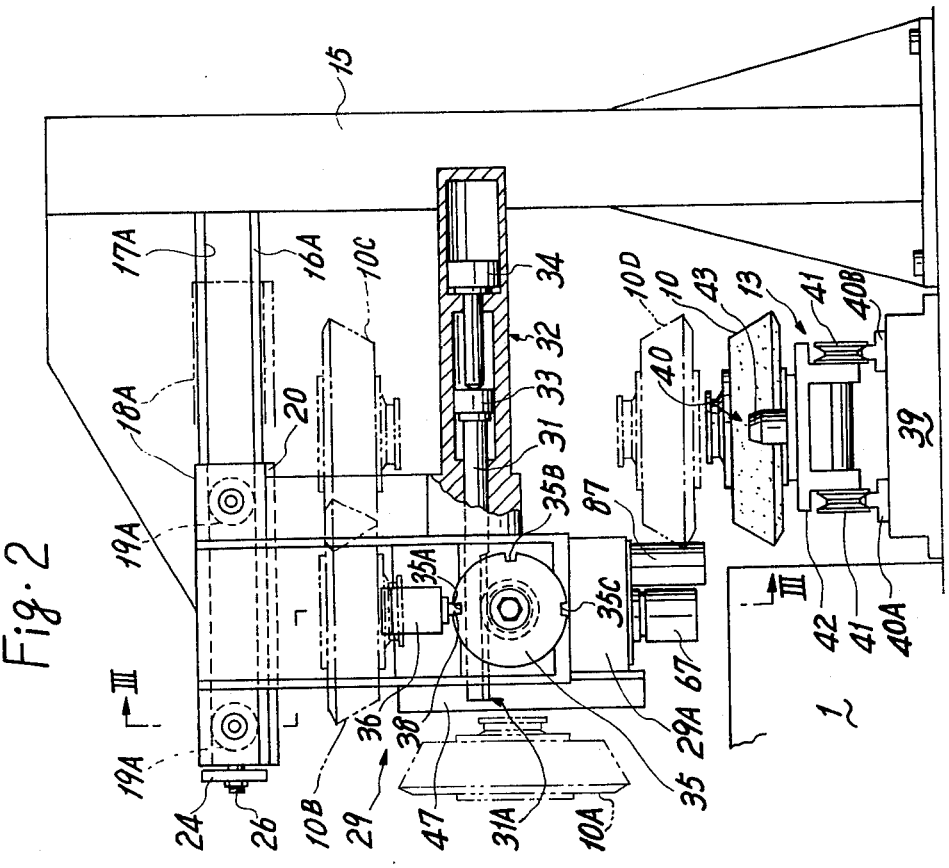
FIG. 2 is an elevation view, partly in cross-section, of an automatic grinding wheel exchange device constructed according to the present invention.
Figure 4:
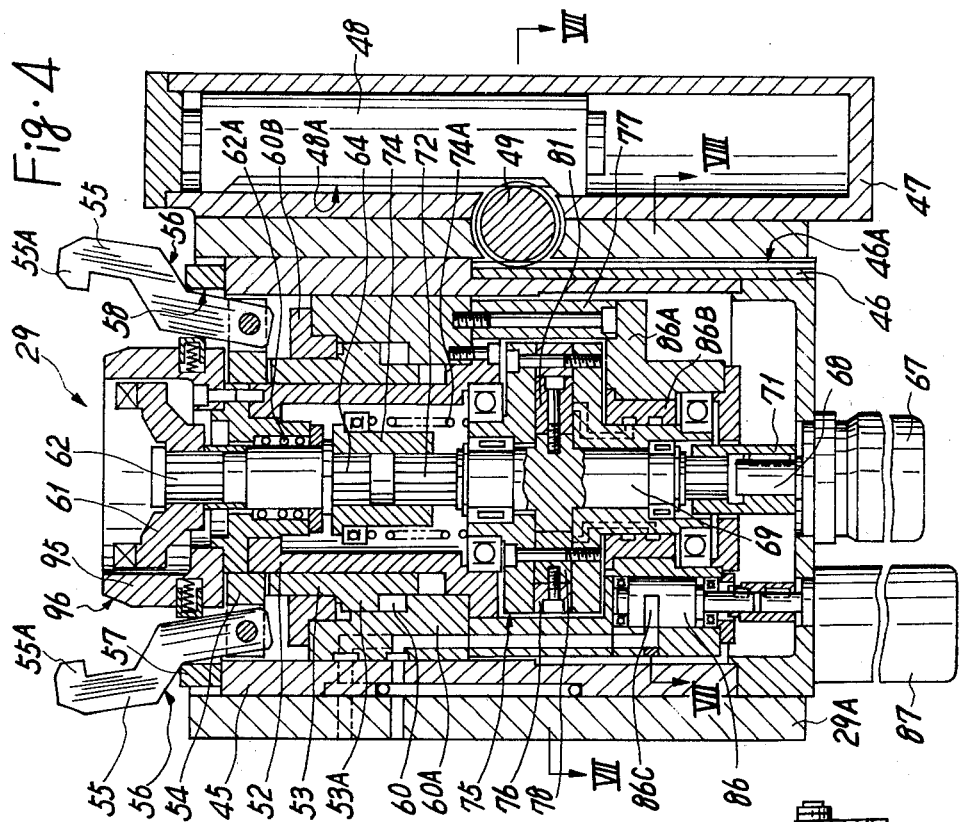
FIG. 4 is an enlarged cross-sectional view of the exchange device taken along the line IV—IV of FIG. 3.
Figure 5:
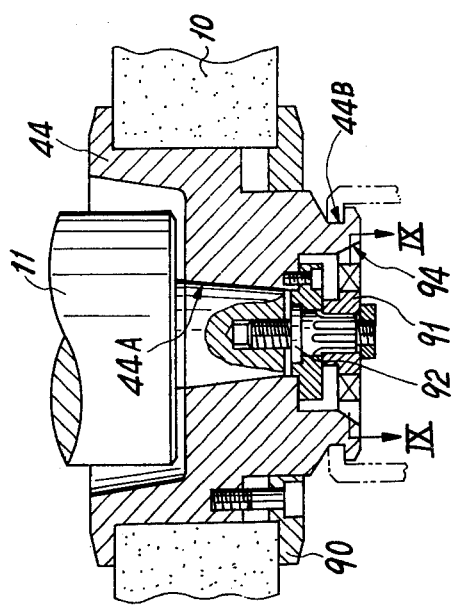
FIG. 5 is an enlarged cross-sectional view of a wheel sleeve.
Figure 6:
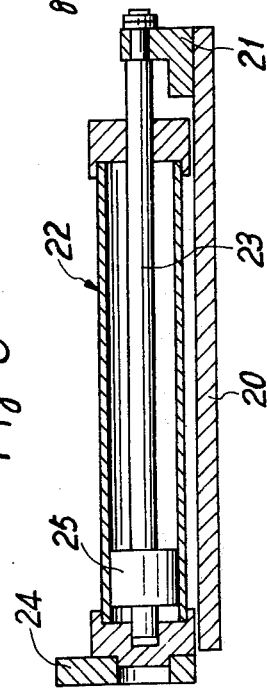
FIG. 6 is an enlarged cross-sectional view of an actuating device taken along the line VI—VI of FIG. 3.

The wheel exchange device will now be more fully explained with particular reference to FIGS. 2—9. As shown in FIG. 2, the wheel exchange device comprises an upstanding support column 15 upon the upper portion of which is fixedly mounted a pair of supporting track members 16A and 16B which extend parallel to the wheel spindle 11. Guide ways 17A and 17B are respectively formed upon the supporting members 16A and 16B for rotatably retaining guide rollers 19A and 19B which are rotatably borne upon a pair of slide members 18A and 18B and members 18A and 18B are slidably mounted upon the supporting members 16A and 16B, respectively, and furthermore, are integrally connected by means of a connecting member 20. Connecting member 20 is secured through means of a bracket 21 to a piston rod 23 which is slidably received within a hydraulic cylinder generally indicated by the reference character 22, as best illustrated in FIG. 6, hydraulic cylinder 22 being secured to and supported by a stop plate 24 which is also secured to supporting members 16A and 16B at the ends thereof which are adjacent to wheel head 9. Adjustably threaded upon stop plate 24 is a stop bolt 26 which the aforenoted ends of slide members 18A and 18B encounter, and accordingly, the slide members 18A and 18B may be moved toward and away from wheel head 9 along the guide ways 17A and 17B in accordance with the operation of hydraulic cylinder 22, the advanced position of slide members 18A and 18B being determined by stop bolt 26.

Figure 3:
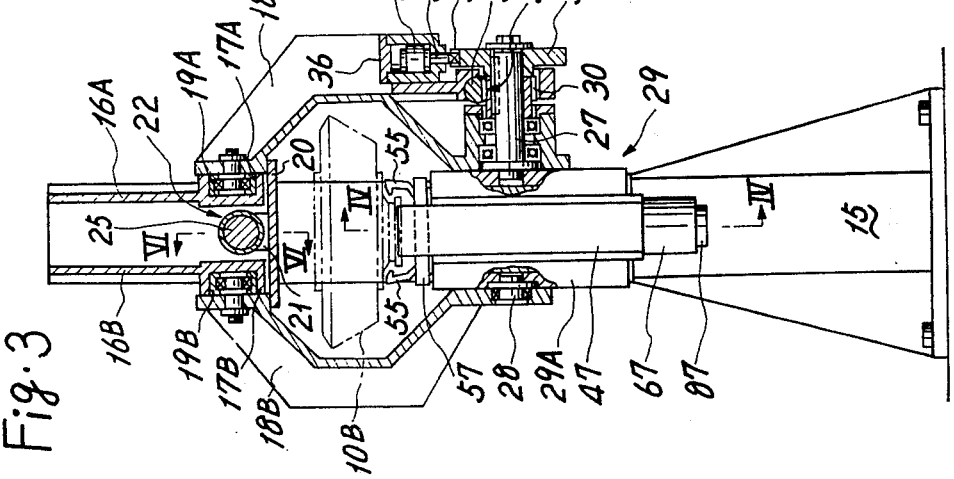
FIG. 3 is a cross-sectional view of the exchange device of FIG. 2 taken along the line III—III of FIG. 2.

At the lower ends of slide members 18A and 18B, a pair of pivot shafts 27 and 28 are rotatably supported about a horizontal axis disposed transversely with respect to the wheel spindle 11 and the respective oppositely disposed ends of the pivot shafts 27 and 28 are fixed upon a support housing 29A which is provided with a cylindrical, transversely extending guide way, as best seen in FIG. 3. A pinion 30 and an index plate 35 are fixed upon pivot shaft 27, and a rack portion 31A of a piston rod 31 is interengaged with pinion 30. A piston 33 associated with piston rod 31 is slidably disposed within a first cylindrical chamber of a dual motion type hydraulic cylinder generally indicated by the reference character 32, cylinder 32 also including a second cylindrical chamber which is tandemly arranged together with the first chamber and being suspended by means of the slide members 18A and 18B.

Slidably disposed within the second chamber, which has a diametrical extent which is greater than that of the first chamber, is a piston 34 from the front end of which a piston rod projects through a transverse partition of hydraulic cylinder 32 so as to confront or contact the rear end of piston 33 thereby varying the stroke of piston rod 31 to two different extents. In this manner, the housing 29A may be rotated through two different angular displacements or arcs, such as for example, 90° and 180° depending upon the two stop positions of piston 34. Furthermore, there is also provided upon the periphery of index plate 35 three cutouts or notches 35A-35C which respectively correspond to 0°, 90° and 180° of angular displacement, and a piston rod 38 of a piston 37, which is slidably disposed within a hydraulic cylinder 36 fixed upon the slide member 18A, is selectively engaged within notches 35A-35C for maintaining the support housing 29A at the respective selected angular position corresponding to one of the notches 34A-35C.

Turning now to the construction of the grinding wheel storage magazine 13, as shown in FIG. 2, a floor base 39 is interposed between bed 1 and the base column 15, and fixedly supported upon floor base 39 at a predetermined angle with respect to the guide members 16A and 16B is a pair of parallel rails 40A and 40B along which a wheel carrier 42 is adapted to be slidably guided through means of guide rollers 41. A plurality of stub shafts 43, such as for example, two, are predeterminedly spaced along the longitudinal extent of carrier 42 and project vertically from the upper surface of carrier 42, a grinding wheel 10, integral with a support sleeve 44, being mounted and stored upon each stub shaft 43 in such a manner that a tapered bore 44A (See FIG. 5) of support sleeve 44 is engaged with a frustconical portion of stub shaft 43.

It is thus seen that in accordance with this embodiment, two grinding wheels 10 as seen in FIG. 1 may be stored upon carrier 42 in a horizontal plane, one of which is positioned at an exchanging station 40 which is defined directly below support members 16A and 16B. Accordingly, as the hydraulic cylinder 14 is operated, a different or new grinding wheel 10 may be shifted to the exchanging station 40 as a result of the sliding movement of carrier 42. It should be noted here that while the storage disposition of the grinding wheels 10 is illustrated as residing within a horizontal plane within this embodiment, it will be appreciated that it is also possible that the storage disposition may be inclined from such a horizontal plane as long as the grinding wheels 10 are stably supported by means of the stub shafts 43 without the adoption of additional securing means.

Referring now more particularly to FIG. 5 wherein a wheel unit principally comprising a grinding wheel 10 and the support sleeve 44 thereof is illustrated, the grinding wheel 10 is secured to the support sleeve 44 through means of an annular securing flange member 90 having suitable fastening members, not numbered, disposed therethrough, and in addition, one end of sleeve 44 is defined with an engagement portion comprising an external annular peripheral recess 44B and an internal recess having an outwardly tapered surface 94. Within the recess, there is disposed a connecting bolt 92 which is supported upon sleeve 44 in concentric relation with the tapered bore 44A, tapered surface 94, and annular recess 44B and provided upon one end of bolt 92 is a male screw bolt which may be releasably threadedly engaged with a female screw socket formed upon the wheel spindle 11 so as to firmly secure the grinding wheel 10 to wheel spindle 11. Upon the other end of bolt 92 there is formed a driven member 91, as shown in FIG. 9, whereby bolt 92 may be rotated, for the noted threaded engagement, by means of a drive member 61, which will be explained hereinafter more in detail.

For releasably grasping the wheel unit comprising wheel 10 and sleeve 44 and removably attaching the same to the wheel spindle 11, a wheel exchange head generally indicated by the reference character 29 is operably mounted upon the support casing 29A, as specifically illustrated in FIG. 4. Slidably guided within casing 29A, in an axial direction transverse to the pivot axes of the same, is a ram 45 upon the right side of which is fixed, in a well-known manner, a rack member 46 which is provided with rack teeth 46A. A hydraulic cylinder 47 is also provided upon support casing 29A in parallel relation with ram 45 for driving the same, a rack piston 48 formed with rack teeth 48A being slidably disposed within hydraulic cylinder 47. In addition, a pinion 49 is also rotatably mounted upon casing 29A for interengaging the drive between rack teeth 48A and rack teeth 46A, and in this manner, ram 45 may be actuated within casing 29A as a result of the operation of piston 48 within cylinder 47.

Furthermore, a gripping and attaching mechanism disposed within ram 45 comprises a fixed sleeve 52 the periphery of which is engaged with a movable sleeve 53 which is slidable in a direction extending parallel with the longitudinal extent of ram 45. A piston portion 53A of movable sleeve 53 is disposed within a hydraulic cylinder chamber 60 which is defined by means of a cylindrical member 60A fixed within ram 45 and a front cap 60B thereof. Secured upon the front end of movable sleeve 53 is a flanged memeber 54 which is provided with a pair of diametrically disposed recesses within which the rear end portions of a pair of latching fingers 55 are pivotally supported for selective open and closed motions.

Each of the rear portions of fingers 55 is defined as an oblique cam surface 56 with which an internal face 58 of an annular member 57 fixed upon ram 45 may be in frictional contact, the fingers 55 always being urged or biased outwardly toward the faces 58 by means of a pair of compression spring-biased plungers, not numbered, which are provided upon a support sleeve 95 fixed upon the front end of fixed sleeve 52. The fingers 55 are, at the front ends thereof, respectively formed with claw portions 55A each of which is adapted to be positively engaged with the annular recess portion 44B of the wheel unit sleeve 44, as seen in dotted lines in FIG. 5, for grasping the wheel unit thereby. Moreover, formed upon the front end of support sleeve 95 in a complimental relationship with respect to the tapered surface 94 of wheel sleeve 44 is a support face 96 which is adapted to be inserted within the tapered portion 94 whereby such structure serves to firmly hold the wheel unit in cooperation with the fingers 55. Accordingly, when the cylinder mechanism 60 is actuated so as to move the movable sleeve 53 downwardly as seen in FIG. 4, each finger 55 will be pivoted inwardly toward one another as a result of the interaction between each oblique cam surface 56 and the annular member 57 whereby the wheel unit may be gripped through means of the interengagement between the annular recess 44B and the fingers 55.

Still further, in order to rotate the driven member 91 of the wheel sleeve 44, the wing shaped drive member 61 is secured upon the front end of a driven shaft 62 which is supported in concentric relation with fixed sleeve 52 and upon the same through means of a so-called stroke ball bearing 62A so as to be capable of both rotational and axial movement. A hydraulically operated reversible motor 67 for rotating drive member 61 is mounted upon the rear end of ram 45 and an output shaft 68 of motor 67 is, through means of a coupling member 71, securely connected with another output shaft 69 of a hydraulically operated rotary actuator 75 for generating the impact motion which use will be apparent hereinafter. The forward end 72 of output shaft 69 is in turn splinedly connected with the rear end 64 of drive shaft 62 through means of a splined sleeve 74. A cylindrical casing 76 of the rotary actuator 75 is rotatably supported, through means of a pair of anti-friction bearings, not numbered, upon the fixed sleeve 52 and a rear member 86A which is firmly connected with the cylindrical member 60A through means of a spacer 77.

With respect to the interior structure of casing 76, as illustrated more specifically in FIG. 7, a pair of wing members 78 and 79 are in slidable contact with the external periphery of output shaft 69 and are fixed upon the internal peripheral surface of casing 76, by suitable fastening members not numbered, with the wing members 78 and 79 being disposed diametrically opposite each other. In addition, fixed upon the outer periphery of output shaft 69, by suitable fastening means, not numbered, is another pair of wing members 80 and 81, also disposed diametrically opposite each other, which are in slidable contact with the internal surface of casing 76 and which may be subjected to impact forces by means of the wing members 78 and 79. Pairs of ports 82 and 83, and 84 and 85, for supplying and exhausting pressurized fluid are provided within the rotary actuator 75, the fluid being conducted to and from such ports by means of a rotary valve 86, as seen in FIG. 8, which is connected to a pressurized fluid source not shown, through means of a fluid distributor 86B which is fixedly interposed between the rear member 86A and the rear end of the casing 76.

The rotary valve 86, rotatably supported within the rear member 86A, is formed with a pair of diametrically opposed peripheral cutout or notched portions 86C and 86D and is connected to the output shaft of motor 87 mounted upon ram 45 so that during each revolution of valve 86, the pressurized fluid from the source, not shown, is alternatively conducted to the ports 82 and 83, and 84 and 85. Accordingly, when the motor 87 is operated in addition to the operation of drive motor 67, by reason of which casing 76 is oscillated relative to output shaft 69, which has already been rotated at a predetermined rate, the wings 78 and 79 may impact upon the wings 80 and 81 at the same rate whereby a great amount of torque is impressed upon the drive member 61 in order to disengage the bolt 92 from the wheel spindle 11.

OPERATION

Within the initial starting condition, all of the movable members as noted hereinabove are in starting positions as shown in the drawings, and more in particular, the wheel head 9 has already attached thereto one wheel unit which has been previously removed from the storage magazine 13 and placed upon the wheel spindle 11, and wherein further, the exchange head 29 is oriented with the front end or fingers 55 thereof being disposed within the uppermost position. When a machining command is given, the wheel head 9 is advanced toward the workpiece W supported by means of the pair of center members 7 and 8, it of course being appreciated that the grinding wheel 10 and the workpiece W have already been rotated by means of motors 12 and 6, respectively. Subsequently, the grinding wheel 10 makes contact with and simultaneously grinds the cylindrical and flanged portions of the workpiece W, whereupon the latter attaining a predetermined size, the former is retracted to the starting position and after terminating the rotation of the workpiece W, one cycle of the grinding operation is completely terminated whereby the operative conditions are once again restored to the starting conditions.

With respect to the exchange operation of the wheel units, when a wheel exchange command is given, the positioning cylinder 36 is operated first so as to disengage the piston rod 38 from the cutout 35A of the index plate 35. The piston 33 of the indexing cylinder 32 is then moved toward the left as seen in FIG. 2, whereby the exchange head 29 is rotated through an angular displacement of 90° about the pivot shafts 27 and 28 in the counterclockwise direction. Consequently, the exchange head 29 is brought into a horizontal position whereby the axis of head 29 is axially aligned with the axis of the wheel spindle 11 and is confronted with the grinding wheel 10 disposed upon spindle 11. After completion of this indexing movement, the piston rod 38 is again engaged into the cutout 35B of the indexing plate 35 so as to securely maintain the head 29 within the horizontal position. The rack piston 48 of the advancing cylinder 47 is thereafter moved away from the spindle 11 or in the downward direction in FIG. 4 whereby the ram 45 disposed within the head 2 is advanced toward the grinding wheel 10 disposed upon wheel spindle 11 through means of the engagement of rack teeth 48A and 46A and the pinion 49. At the advanced position, the support sleeve 95 and the support face 96 thereof firmly engages the tapered surface 94 of the wheel sleeve 44 whereby the wheel sleeve 44 may be correctly oriented and aligned with the exchange head 29.

The next operational stage involves the actuation of the hydraulic cylinder 60 which serves to move the movable sleeve 53 in a downward direction in FIG. 4 whereby the fingers 55 whose claw portions 55A have been disposed in surrounding relationship with respect to the annular recess 44B of the wheel sleeve 44, may become engaged with the wheel sleeve 44 as a result of the sliding contact between the inclined cam surfaces 56 of fingers 55 and the annular member 57. In this manner, the fingers 55 may firmly grasp and retain the wheel unit upon the exchanging head 29 in cooperation with the support sleeve 95 thereof. Ram 45 is thereafter retracted as a result of the reverse operation of cylinder 47 whereby the wheel unit disposed upon the wheel spindle 11 may be released and withdrawn therefrom. In conjunction with such, the drive motor 67 is actuated so as to be operated in reverse in order to reversely rotate the drive member 61 through means of output shafts 68 and 69 and drive shaft 62. If the drive member 61 is, prior to the rotational movement of motor 67, already correctly engaged with the driven member 91 of fastening bolt 92, then the former immediately functions to rotate the latter. On the other hand, if the drive member 61 is not initially correctly engaged or aligned with the driven member 91, the drive member 61, urged by means of a coil compression spring 74A interposed between sleeve 74 and rotary actuator 75, may be brought into such correct engagment within one revolution thereof whereby the same will then impart a releasing torque upon the driven member 91.

In order that the connecting bolt 92, by which the wheel 44 has been firmly secured upon the wheel spindle 11 may be easily loosened, the motor 87 associated with the rotary valve 86 may be rotated at a predetermined speed in conjunction with the operation of motor 67. Accordingly, the rotary valve 86 alternates the directions or paths through which the pressurized fluid may be led into and from the ports 82 and 83, and 84 and 85 of the rotary actuator 75, whereby the cylindrical casing 76 may be oscillated about and relative to the output shaft 69. As a result of such action, the wing members 78 and 79 of casing 76 violently impact upon the wing members 80 and 81 of the shaft 69 at the predetermined rate, and the drive member 61 may transmit such impact forces, depending upon the actuation of rotary actuator 75, in addition to the constant torque developed by means of motor 67, upon the driven member 91. Therefore, the connecting bolt 92 is easily released from the wheel spindle 11 and such releasing movement of bolt 92 permits the detachment of the tapered bore portion 44A of the wheel sleeve 44 from the frustoconical portion of the wheel spindle 11. As soon as the bolt 92 is completely released from engagement with the wheel spindle 11, the exchange head 29 is immediately retracted together with the wheel unit as the rack-piston 48 is forced to be moved in an upward direction in FIG. 4. Subsequently, when the piston 48 has completed the retracted operation, the operations of motors 67 and 87 are terminated and the wheel unit is positioned as shown by means of the dotted line and as designated 10A in FIG. 2.

The piston rod 38 is thereafter disengaged from the cutout or notched portion 35B as a result of the operation of cylinder 36, and subsequently the piston rod 31 is moved toward the right, as seen in FIG. 2, so as to rotate the exchange head 29, upon which the removed wheel unit is retained, in a clockwise direction and through an angular displacement of 90°, the stroke of piston 31 in the right direction being defined by the extreme left end disposition of piston 34. The wheel unit has now been rotated into the position designated 10B and the piston rod 38 is again engaged within the cutout or notched portion 35A whereby the components are now ready to be traversed from the position designated 10B to that position designated 10C. In order to accomplish such movement, the shift cylinder 22, as shown in FIG. 6, is operated toward the right stroke end thereof whereby the wheel unit supported upon the exchange head 29 will be moved laterally so as to become vertically aligned with the stub shaft 43 positioned at the exchange station 40.

Within this position, the pistons 33 and 34 are moved toward the right as seen in FIG. 2, within cylinder body 32 subsequent to the disengagement of piston rod 38 from the cutout portion 35A, whereby the exchange head 29 is rotated in a clockwise direction through an angular displacement of 180°, which corresponds to the stroke of the piston 34, whereby the wheel unit is consequently transferred from the position designated 10C to that position designated 10D. This indexing movement and position of the exchange head 29 is then locked as a result of the engagement of piston rod 38 within the cutout 35C, and thereafter, ram 45 is moved toward the stub shaft 43 disposed at the exchange station 40 as a result of the operation of cylinder 47. The previously used wheel unit is therefore correctly oriented and seated upon the frustoconical portion of stub shaft 43 through means of the tapered bore 44A of the wheel sleeve 44 and is thus restored upon the wheel carrier 42. The exchange head 29 then releases such wheel unit and wheel sleeve 44 as a result of the opening motion of fingers 55 in association with the advanced operation of cylinder 60 and is thereafter moved in an upward direction away from carrier 42 as a result of the operation of cylinder 47 whereby the wheel unit is deposited and remains upon the magazine, a loading operation for another, new or different, wheel unit then being initiated within the next stage of the operation.

Carrier 42 is then moved downwardly as seen in FIG. 1 as a result of the actuation of the positioning cylinder 14 whereby the other wheel unit stored upon carrier 42 is now brought to the exchange station 40 and disposed directly below the exchange head 29. Ram 45 is thereafter moved downwardly toward the other wheel unit whereby the support sleeve 95 is engaged with the tapered surface 94 of the wheel sleeve 44 through means of the support face 96 thereof, and the exchange head 29 firmly grasps the new wheel unit thereto as a result of the closing motion of fingers 55 which in turn depend upon the retraction operation of cylinder 60. After the piston rod 38 is disengaged from the cutout portion 35C and the ram 45 has been moved away from the carrier 42, the piston 34 is moved toward the left as seen in FIG. 2 whereby the piston rod thereof pushes the piston 33 toward the left. Accordingly, the exchange head 29 is rotated in a counterclockwise direction and through an angular displacement of 180° so as to transfer the new wheel unit to the position designated 10C, the cutout portion 35A being engaged by means of piston rod 38, and subsequently thereafter, the exchange head 29 is moved toward the left by means of the actuation of shift cylinder 22 so as to place the exchange head 29 within the starting position as shown in FIG. 2.

From this starting position, indexing cylinder 36, piston 33 of the dual motion cylinder 32, and cylinder 47 are again operated in a sequence similar to that which has already been fully explained in connection with the wheel detaching or unloading operations, and accordingly, the other or new wheel unit which has been retained upon exchange head 29 is able to be engaged with and disposed upon the wheel spindle 11 through means of the tapered bore 44A, the drive motor 67 thereafter being rotated so as to firmly engage the connecting bolt 92 and wheel sleeve 44 with the wheel spindle 11 as a result of the actuation of drive member 61. The completion of such a securing operation by motor 67 may be detected by means of a suitable pressure detection switch, not shown, which is operated in response to a predetermined pressure value produced within the fluid circuit when the motor 67 becomes operationally stalled. The fingers 55 are thereafter opened by means of the operation of cylinder 60 so as to release the wheel unit, cylinder 47. Furthermore the indexing cylinder 36, and piston 33 of the dual motion cylinder 32 are also operated so as to accordingly return the exchange head to the starting position, the entire cycle of the exchange operation thereby being completed.

Figure 10:
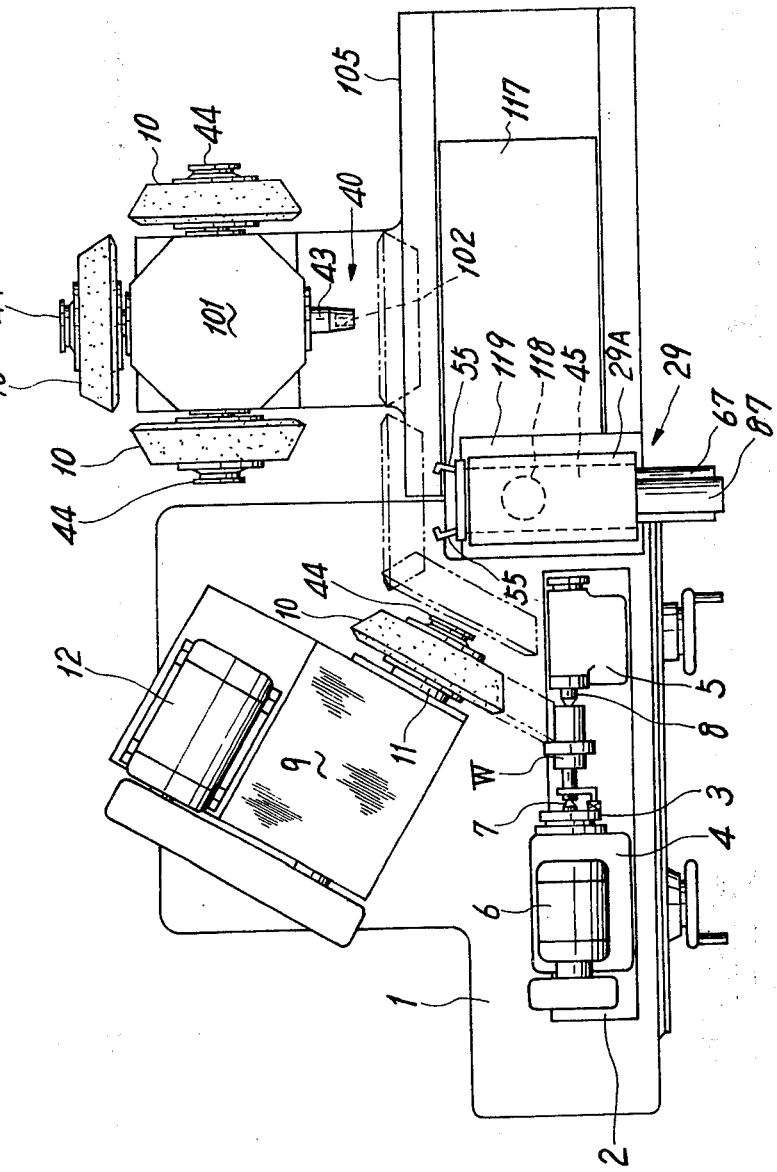
FIG. 10 is a plan view similar to that of FIG. 1 showing however another embodiment of a grinding machine constructed according to the present invention and showing its cooperative parts; and, FIG. 11 is a side elevation view, partly in section, of the apparatus shown in FIG. 10.
Figure 11:
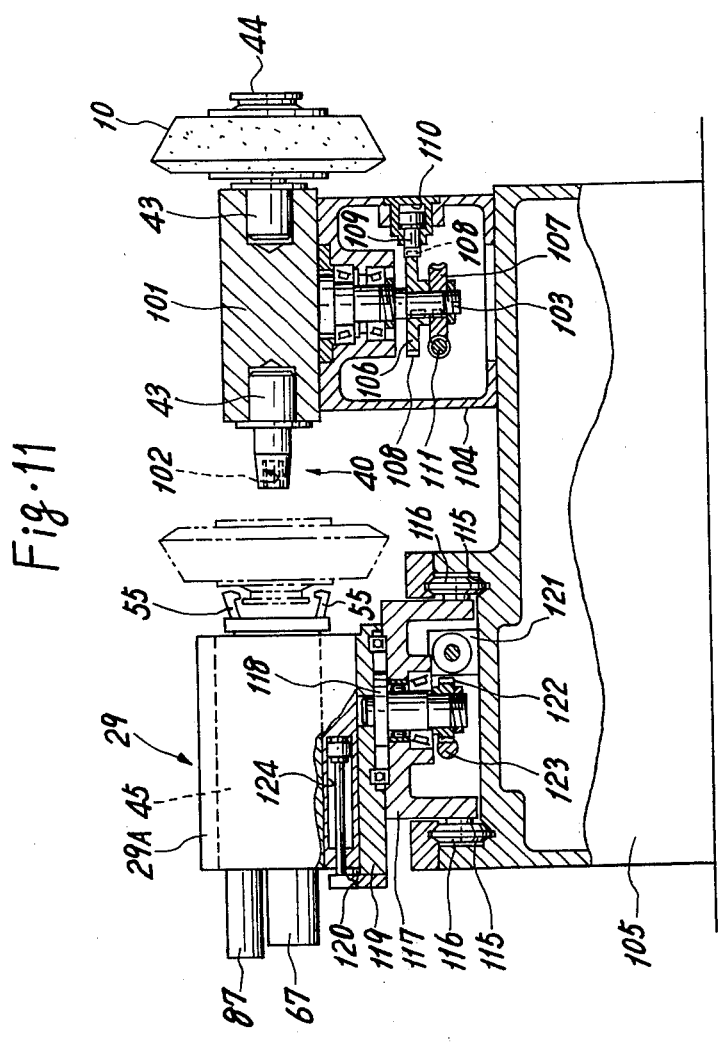

Referring now to FIGS. 10 and 11, another embodiment of the exchange device constructed according to the present invention will now be explained. Within this embodiment a plurality of wheel units, such as for example, four wheel units, may be respectively mounted upon stub shafts 43 each of which projects radially within a horizontal plane from a rotatable carrier 101 and is formed with a threaded bore 102 which is adapted to engage the connecting bolt 92 of the wheel sleeve 44 in order to removably secure the same thereto. The vertically disposed support shaft 103, see FIG. 11, for wheel carrier 101 is rotatably mounted upon a magazine base 104 which in turn is fixed upon a base member 105. Secured upon the lower end of support shaft 103 is an index plate 106 and a worm wheel 107, the former of which has four index notches or cutouts 108 selectively engageable with a piston rod 109 of a indexing cylinder 110, while the latter of which may be rotated, through means of a worm gear 111, by a motor, not shown.

With respect to the operation of this magazine, when a previously used wheel unit which was secured upon the wheel spindle 11 has been restored upon one of the stub shafts 43 at the exchange station 40 by means of the exchange head 29, the rotatable carrier 101 may be freed as a result of the disengaging operation of piston rod 109 and thereafter rotated through a desired angular displacement by means of the indexing motor. Accordingly, a desired unit may be brought to the exchange station 40 in order to wait for the subsequent loading and attaching operations. Slidably mounted upon the base member 105, along guide ways 115 and through means of rollers 116, is a shuttle carrier 117 upon which a support shaft 118 for a turntable 119 is rotatably mounted. The turntable 119 slidably supports, upon a guideway 120 thereof, a support housing 29A within which a ram 45 is securely mounted, an attaching device, not shown, which is identical in construction and function to the device shown in FIG. 4, being in turn disposed within ram 45.

In the starting condition as shown in FIGS. 10 and 11, the support shaft 118 is rotated together with the turntable 119 through means of a pinion 122 and a rack member 123 as a result of the operation of an indexing actuator not shown, which is connected to the rack member 123. As a result the exchange head 29 is axially aligned with the wheel spindle 11 whereupon a presenting actuator 124, which is provided within the support housing 29A, is thereafter operated so as to advance the exchange head 29 toward the wheel head 9. Subsequently, the head 29 releases and removes the used wheel unit from the wheel spindle 11 and is thereafter angularly rotated so as to return to the starting position. The shuttle carrier 117 is then moved toward the right as seen in FIG. 10 as a result of the operation of the feed actuator 121 and the same is stopped at a predetemined point at which the exchange head 29 is in axial alignment with the stub shaft 43 positioned at the exchange station 40.

Subsequently, the exchange head 29 approaches the carrier 101 and mounts the used wheel unit upon the stub shaft 43 for restoring the same thereto. The wheel carrier 101 is then rotated so as to index another wheel unit to the exchange station 40, after the exchange head 29 has been retracted therefrom, and subsequent to the indexing operation, the head 29 once again approaches the magazine or carrier 101 for grasping the indexed unit. After the head 29 is again retracted from the carrier 101, the shuttle carrier 117 is moved toward the wheel head 9 whereby the new or other unit may be secured upon the wheel spindle 11 as a result of the mounting operation performed by the suitable mechanisms of head 29.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A grinding machine comprising:
   a wheel head,
   a wheel spindle rotatably mounted upon said wheel head and having a wheel support end for supporting one of a plurality of wheel holders respectively fixing grinding wheels, each wheel holder having means defining a bore which is engageable with said wheel support end;
   a storage device provided with a plurality of stub shafts each of which includes a holder support end for supporting one of said wheel holders as a result of the engagement between said means defining said bore and said holder support end, said holder support end having a configuration similar to that of said wheel support end; and
   an exchange device for transferring one of said wheel holders from said storage device to said wheel head in order to attach said one of said wheel holders to said wheel spindle through the engagement between said bore and said wheel support end.

2. A grinding machine as set forth in claim 1, wherein said storage device comprises:
a wheel carrier movable within a horizontal plane and supporting said stub shafts which project vertically from the upper surface of said carrier so as to support said wheel holders within a horizontal plane; and
drive means for moving said wheel carrier so as to bring one of said wheel holders supported upon said stub shafts to an exchange station which is located at a predetermined position relative to said exchange device.

3. A grinding machine comprising:
a wheel head;
a wheel spindle mounted upon said wheel head so as to be rotatable about a horizontal axis and including a wheel support portion which is provided with first threaded means disposed at one end thereof;
a storage device for storing a plurality of wheel sleeves in a horizontal plane each of which includes means defining a bore engageable with said wheel support portion and second threaded means connectable with said first threaded means, said wheel sleeves firmly fixing grinding wheels thereon respectively;
guide means extending from the vicinity of said wheel spindle to said storage device and aligned parallel with the axis of said wheel spindle;
a shuttle carrier movable along said guide means between said wheel spindle and said storage device;
an exchange device including gripping means for gripping and supporting one of said wheel sleeves and drive means for reversibly rotating said second threaded means for attaching and detaching one of said wheel sleeves to and from said wheel spindle through the connection between said first and second threaded means;
means for pivotably suspending said exchange device from said shuttle carrier; and
indexing means for pivoting said exchange device between two positions so as to selectively confront said exchange device with said wheel spindle and said storage device.

4. A grinding machine as set forth in claim 3, wherein said storage device comprises:
a wheel carrier movable within a horizontal plane;
a plurality of stub shafts projecting vertically from the upper surface of said wheel carrier for supporting said wheel sleeves and wheels in a horizontal plane; and
drive means for moving said wheel carrier so as to bring one of said wheel sleeves and wheels supported upon said stub shafts to an exchange station which is located at a predetermined position relative to said exchange device.

5. A grinding machine comprising:
a machine base;
a wheel head mounted upon said machine base;
a wheel spindle mounted upon said wheel head so as to be rotatable about a horizontal axis and including a wheel support end for supporting one of a plurality of wheel sleeves which are fixedly provided with grinding wheels respectively;
storage device means disposed alongside said machine base within the vicinity of said support end and including a plurality of vertically extending stub shafts for supporting said wheel sleeves within a horizontal plane through engagement means cooperative therebetween similar to that between said support end and said wheel sleeves;
transfer head means pivotable about a horizontal axis for transferring one of said wheel sleeves from said storage device means to said support end;
attaching means mounted upon said transfer head for gripping one of said wheel sleeves at said storage device means and for attaching said one of said wheel sleeves to said support end; and
drive means for pivoting said transfer head away from said machine base in order to transfer said transfer head from said storage device means to said support end without any interference between said machine base and said one of said wheel sleeves and wheels gripped by said attaching means.

6. A grinding machine as set forth in claim 5, which further comprises:
transfer guide means extending parallel to said axis of said wheel spindle;
a shuttle carrier adapted to be moved along said transfer guide means and pivotably mounting said transfer head and said drive means; and
carrier shift means for moving said shuttle carrier and said transfer head along said transfer guide means to and away from said storage device and said support end in conjunction with the pivotable movement of said transfer head.

7. A grinding machine comprising:
a wheel head;
a wheel spindle rotatably mounted upon said wheel head and including a support end having a first threaded means for supporting one of a plurality of wheel sleeves each of which is adapted to firmly fix a grinding wheel and provided with a bore and a second threaded means, said bore and second threaded means being respectively engageable with said support end and said first threaded means;
a storage device provided with a plurality of support shafts each of which is engageable with said bore so as to removably support said wheel sleeves and which have third threaded means similar to said first threaded means;
means for transferring one of said wheel sleeves between said wheel head and said storage device and for selectively mounting said one of said wheel sleeves upon said support end and one of said support shifts; and
drive means mounted upon said transfer means for driving said second threaded means so as to selectively secure said one of said sleeves upon wheel spindle and said one of said support shafts.

8. A grinding machine as set forth in claim 7, wherein said wheel spindle is rotatable about a horizontal axis and said storage device further comprises:
a rotatable wheel carrier mounting said support shafts which extend radially therefrom and which are disposed within a horizontal plane; and
an indexing device for selectively rotating said wheel carrier so as to selectively present one of said wheel sleeves to an exchange station while still disposed within said horizontal plane;
said transfer means being capable of transferring said one of said wheel sleeves between said wheel head and said exchange station while maintaining said one of said wheel sleeves within a vertical plane.

9. A grinding machine comprising:
a wheel head;

a wheel spindle rotatably mounted upon said wheel head and having first threaded means disposed at one end thereof;

a storage device for removably storing a plurality of wheel sleeves each of which includes second threaded means engageable with said first threaded means, said wheel sleeves being fixedly provided with grinding wheels respectively;

means for transferring one of said wheel sleeves between said storage device and said wheel head; and drive means, for driving said second threaded means for attaching said wheel sleeves to said wheel spindle, including a drive member engageable with said second threaded means, a first drive actuator for driving said drive member by means of a first force, and a second drive actuator for applying a second force to said drive member in addition to said first force.

10. A grinding machine as set forth in claim 9, wherein said second drive actuator comprises:

a hydraulic rotary actuator having at least one pair of chambers defined in part by a rotary shaft and a rotary casing rotatably mounted upon said rotary shaft, said rotary shaft being operably connected with said drive member and said first actuator;

first and second stops respectively provided upon said rotary shaft and said rotary casing so as to limit the relative rotational movement therebetween; and fluid distribution means for alternatively supplying pressurized fluid into said chambers so as to oscillate said casing and generate an impact force upon said drive member as a result of the successive collisions between said first and second stops.

11. A grinding machine as set forth in claim 10, wherein said stops are wing members disposed within said rotary casing and serving to define said chambers with said shaft and casing, and wherein said fluid distribution means comprises:

a rotary valve for alternatively conducting said pressurized fluid into said chambers in accordance with the rotation thereof; and a drive motor for rotating said rotary valve.

12. A grinding machine as set forth in claim 10, wherein:

said second threaded means are respectively supported upon said wheel sleeves in concentric relation therewith;

said drive means is mounted upon said transfer device; and said transfer device further comprises gripping means in concentric relation with said drive member for gripping said wheel sleeves.

\* \* \* \* \*